United States Patent [19]

Hannah et al.

[11] Patent Number: 5,272,482
[45] Date of Patent: Dec. 21, 1993

[54] RADAR APPARATUS

[75] Inventors: David A. Hannah, Writtle; Keith J. Blundy, Chadwell Heath, both of England

[73] Assignee: Smiths Industries Public Limited Company, London, England

[21] Appl. No.: 848,990

[22] PCT Filed: Jan. 11, 1991

[86] PCT No.: PCT/GB91/00038
§ 371 Date: Apr. 21, 1992
§ 102(e) Date: Apr. 21, 1992

[87] PCT Pub. No.: WO91/11733
PCT Pub. Date: Aug. 8, 1991

[30] Foreign Application Priority Data
Jan. 29, 1990 [GB] United Kingdom ............. 9001954

[51] Int. Cl.⁵ .............................................. G01S 7/06
[52] U.S. Cl. ........................................ 342/176; 342/185
[58] Field of Search ................................. 342/176, 185

[56] References Cited
U.S. PATENT DOCUMENTS
3,653,044 3/1972 Breeze et al. ................. 342/185

Primary Examiner—T. H. Tubbesing
Attorney, Agent, or Firm—Pollock, VandeSande and Priddy

[57] ABSTRACT

A radar of particular use at close range has a CRT that is scanned in a spiral fashion by applying phase quadrature sinusoidal signals to resonant deflection coils. A digitizer converts the radar return signals to multi-bit signals which are supplied to a memory with signals for alternate pixels stored in different halves of the memory. The apparatus reads out signals from one half of the memory during one scan and reads out signals from the other half of the memory during the next scan so that they are interleaved with the pixels on the display brightened by the first scan.

12 Claims, 4 Drawing Sheets

RADAR APPARATUS

BACKGROUND OF THE INVENTION

This invention relates to radar apparatus.

Conventional modern radar displays generally utilize a cathode-ray tube scanned on a rectangular raster to present an image of the radar return signals, range and bearing markers and graphic information to the user. Where high resolution is required, a 1000 line raster scan is employed. Adjacent pixels along a line of a rectangular raster have the same separation over the entire screen so that the cartesian resolution over the screen is identical, but the bearing resolution is progressively lower towards the radar origin (that is, the radar-carrying ship). In many circumstances, such as when navigating a vessel in open water, this is satisfactory at some distance from the radar origin. There are, however, circumstances in which a greater bearing resolution is required at close ranges, such as when navigating in rivers, canals and estuaries and when berthing. A conventional rectangular raster-scanned radar cannot provide the degree of bearing resolution that is required.

It has been previously proposed to use a spiral-scanned display which has the advantage that the separation between adjacent pixels close to the center of the display, that is, within close range of the radar-carrying vessel, is less than at the edge of the display, because they each subtend the same angle. Such a display should provide a greater resolution in the region where it is of most importance. In practice, however, such spiral-scanned displays have not provided the desired resolution, because very high processor speeds are necessary to handle the data. For example, using a line rotation frequency of 36 KHz with 2048 bits of screen data in one rotation would require a memory read frequency of 73 MHz. To handle data at this frequency would be very difficult and prohibitively expensive in commercial applications.

SUMMARY OF THE INVENTION

It is an object of the present invention to provide radar apparatus with a spiral-scanned or ring-scanned display which avoids the need to process data at very high speeds.

According to one aspect of the present invention there is provided radar apparatus including a display and a memory that stores information about the range and bearing of radar return signals, characterized in that the apparatus includes a deflection circuit that scans the display in successive scans of angular rotation having different radial distances, in that the apparatus reads out from the memory information in respect of alternate pixels, and in that alternate bearing pixels of one scan are interleaved with alternate pixels of the next scan.

In this way the speed of handling the data is half what would otherwise be required.

The deflection circuit preferably scans the display in a spiral scan. The deflection circuit may include two deflection coils, a capacitor connected to each respective coil, a circuit that supplies two sinusoidal signals in phase quadrature to respective ones of the coils, and the coils being resonant. The apparatus preferably reads out information from the memory in the form of plural-bit words with each bit equivalent to two pixels in bearing. The apparatus may include a circuit that blanks out one half of each bit read out from the memory. The blanking circuit may include a digital-to-analog converter.

The memory is preferably divided into two halves, the apparatus supplying radar return signals in respect of alternate pixels to different ones of the two halves of the memory, and the apparatus reading out the contents of one half of the memory during one scan and reading out the contents of the other half during the next scan. The memory may have locations arranged by range and bearing.

The apparatus may include a circuit that rejects radar signals indicative of a radar target in a pixel unless the radar signals also indicate the presence of a target in an adjacent pixel. The circuit may include a comparator and a delay that introduces a delay equivalent to one pixel into the radar signals, the comparator receiving radar signals directly and via the delay and rejecting those direct signals which are not the same as the delayed signals. The circuit that rejects radar signals is preferably located at the input of the memory, and only signals not rejected by the circuit are passed to the memory.

The apparatus preferably increases the brilliance of the display at increasing radial distance from the center of the scan in such a way as to produce a substantially even brightness for radar targets over the display.

BRIEF DESCRIPTION OF THE DRAWINGS

Radar apparatus in accordance with the present invention will now be described, by way of example, with reference to the accompanying drawings, in which.

DESCRIPTION OF THE PREFERRED EMBODIMENTS

Figure 1:
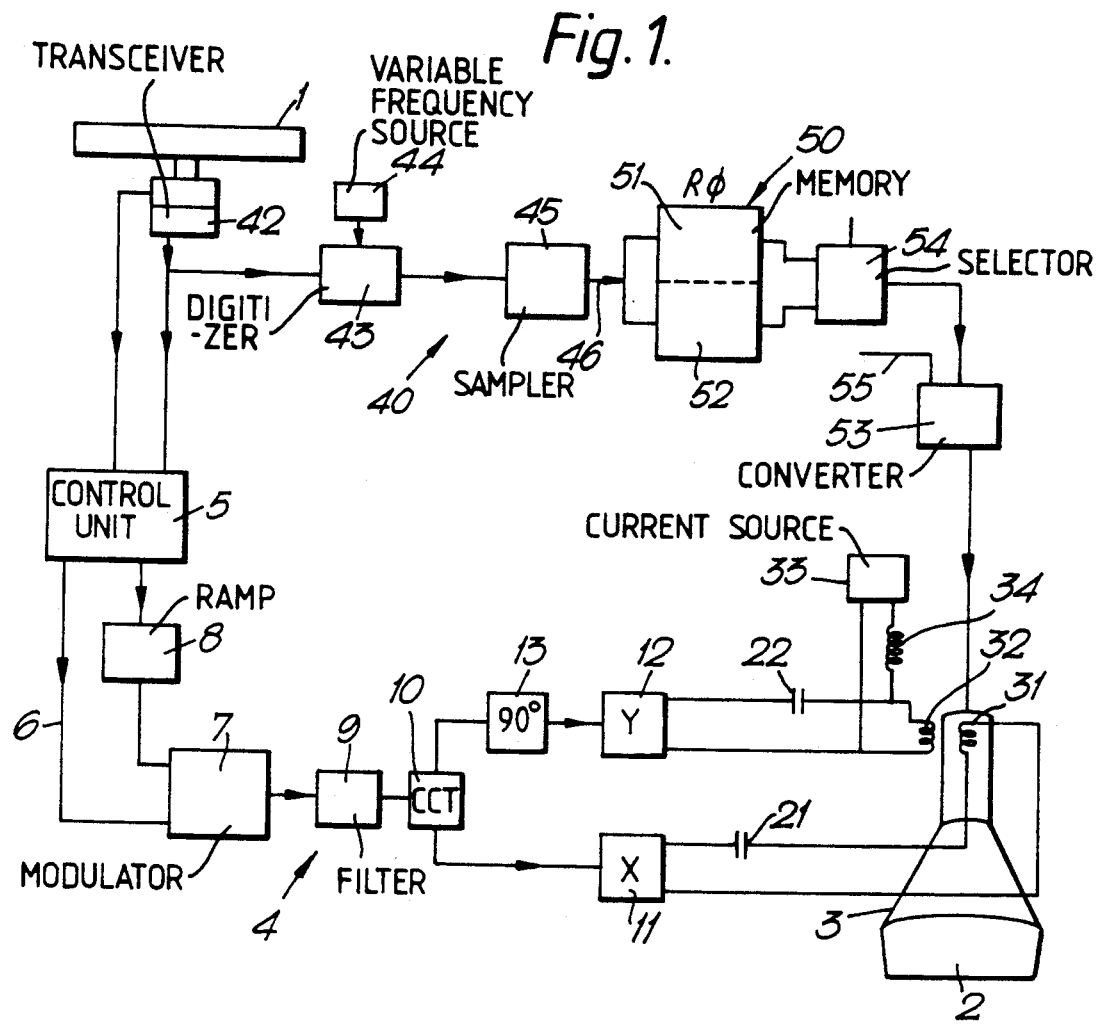
FIG. 1 shows the apparatus schematically.
Figure 2:
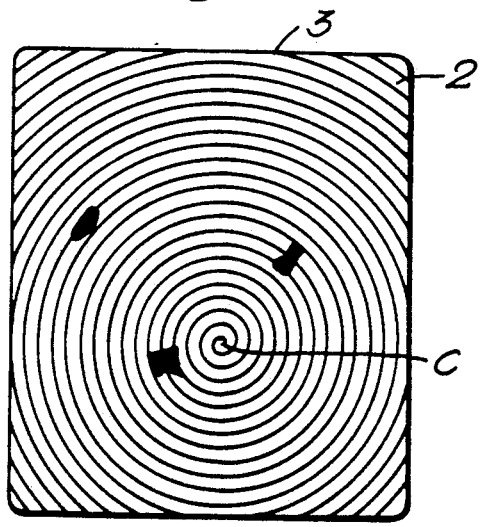
FIG. 2 illustrates the display provided by the apparatus.

With reference to FIG. 1, the apparatus includes a conventional end-fed slotted array aerial 1 which is rotated in azimuth at 30 rpm. A display of the radar return signals is provided on the screen 2 of a cathode ray tube 3 which is scanned in a spiral scan, as shown in FIG. 2, by a deflection circuit 4.

Figure 3:
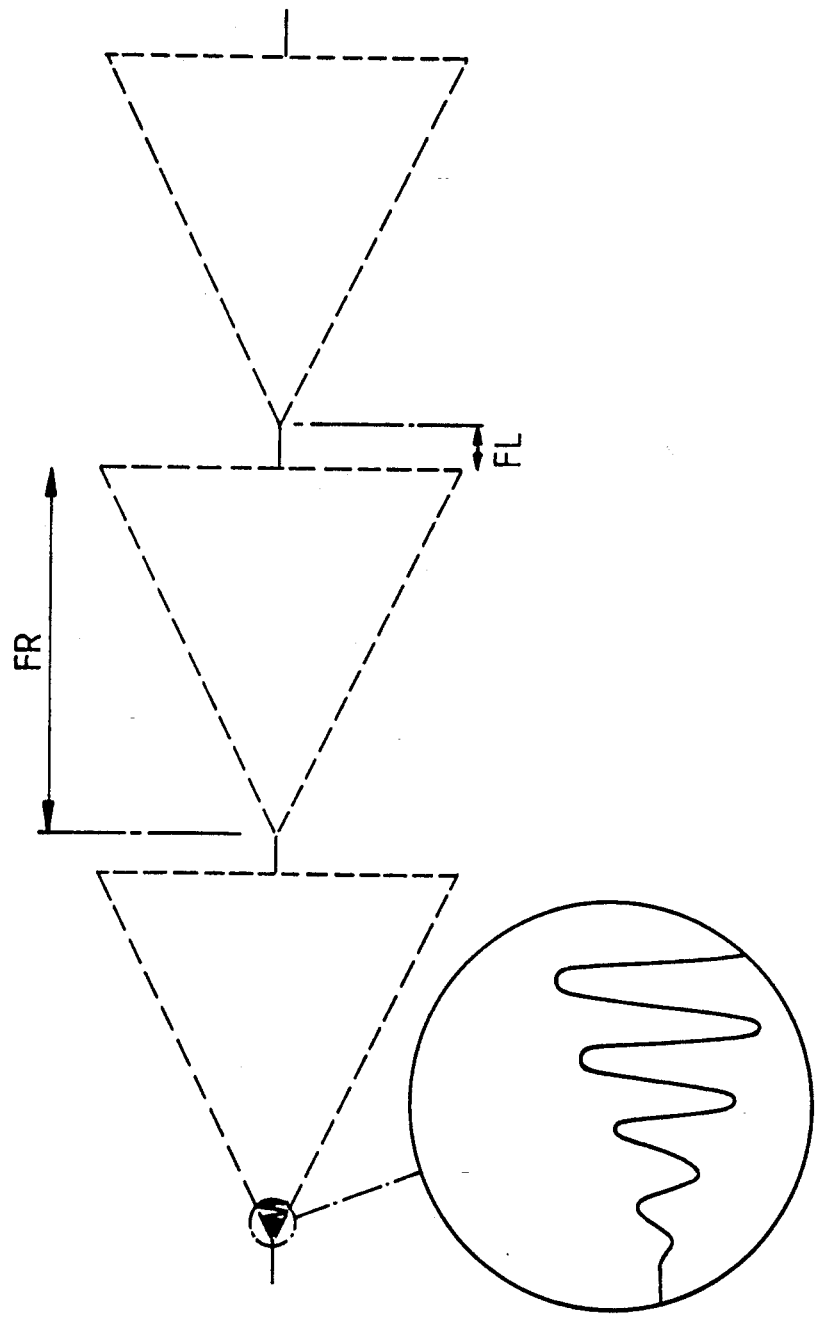
FIG. 3 shows a deflection signal used in the apparatus.

The deflection circuit 4 includes a processor control unit 5 that receives data representing the speed of rotation of the aerial 1 and provides a line rotation clock signal, in the form of a square wave at 36 KHz, on line 6 synchronized to aerial rotation. This signal is supplied to a modulator 7 together with signals from a ramp generator 8 which receives a frame sync signal from the control unit 5. The ramp is shaped to optimize scan linearity on the display. In the modulator 7, the ramp signal is chopped by the line rotation clock signal to give an amplitude modulated pulse train signal of the kind shown in FIG. 3 with a linearly increasing amplitude. The period FR of each group of modulated pulses is the frame scan period (typically 17 ms) and the separation FL between adjacent groups of pulses is the flyback period. The modulated signal is supplied to a low-pass filter 9 which removes harmonics of the square wave chopping frequency. The output from the filter 9 is diverted by a circuit 10 into two paths one of which is directly to an X-deflection amplifier 11 and the other of which is to a Y-deflection amplifier 12 via a 90 degree phase shifter 13. The amplifiers 11 and 12 provide sinusoidal signals in phase quadrature which are fed to respective resonant circuits comprising a capacitor 21 and 22 respectively and Y and X deflection coils 32 and 31 of the CRT 3. The fact that the coils 31 and 32 are resonant reduces the drive voltage required and provides further filtering of the scan waveform. Connected across the Y (vertical) deflection coil 32 is a constant current source 33 which is connected in series with an inductor 34 so that it presents a high impedance at the line rotation frequency and isolates the deflection amplifier 12 from the constant current source. The source 33 is used to adjust the offset of the center C of the scan on the screen 2. The screen 2 of the CRT 3 is of rectangular shape with its longer sides arranged vertically, that is, parallel to the heading of the vessel (portrait mode). When the vessel is travelling in a forward direction it is preferable for the center of the scan C, corresponding to the position of the vessel, to be located below the center of the screen to maximize the view ahead.

Signals from the aerial 1 are supplied to the cathode ray tube 3 via a signal processing circuit 40. A transceiver 42 provides the transmitted radar pulses to the aerial and supplies video electrical signals, in response to the received radar return signals, to a video digitizer 43. The digitizer 43 is controlled by a variable frequency source 44 and provides output signals to a sampler 45. The sampler 45 provides output signals on line 46 giving information in respect of the range R and bearing φ in azimuth of all radar return signals above a threshold value. The signals on line 46 are in the form of 16 bit words which bits identify individual ones of 2048 bits in azimuth, one of 512 bits in range and identify whether the particular location in range and azimuth corresponds with a radar reflecting object, that is, whether the corresponding location on the radar display should be brightened or not. Each of the words on line 46 therefore corresponds with 16 of the pixels on the display.

The signals on line 46 are supplied to the input of a memory 50 which is divided into two halves 51 and 52. Words on line 46 with alternate azimuth bits are supplied to different halves 51 and 52 of the memory, the first word being supplied to the first half 51, the second word being supplied to the second half 52, the third word being supplied to the first half 51 and so on. The locations in the memory 50 are arranged by range R and azimuth bearing φ so that they are directly related to the input words, thereby avoiding the need to convert to orthogonal x, y coordinates as is the conventional practice with rectangular raster radar. Each half 51 and 52 of the memory 50 will contain information about alternate pixels around each of the 512 range scans.

Figure 4:
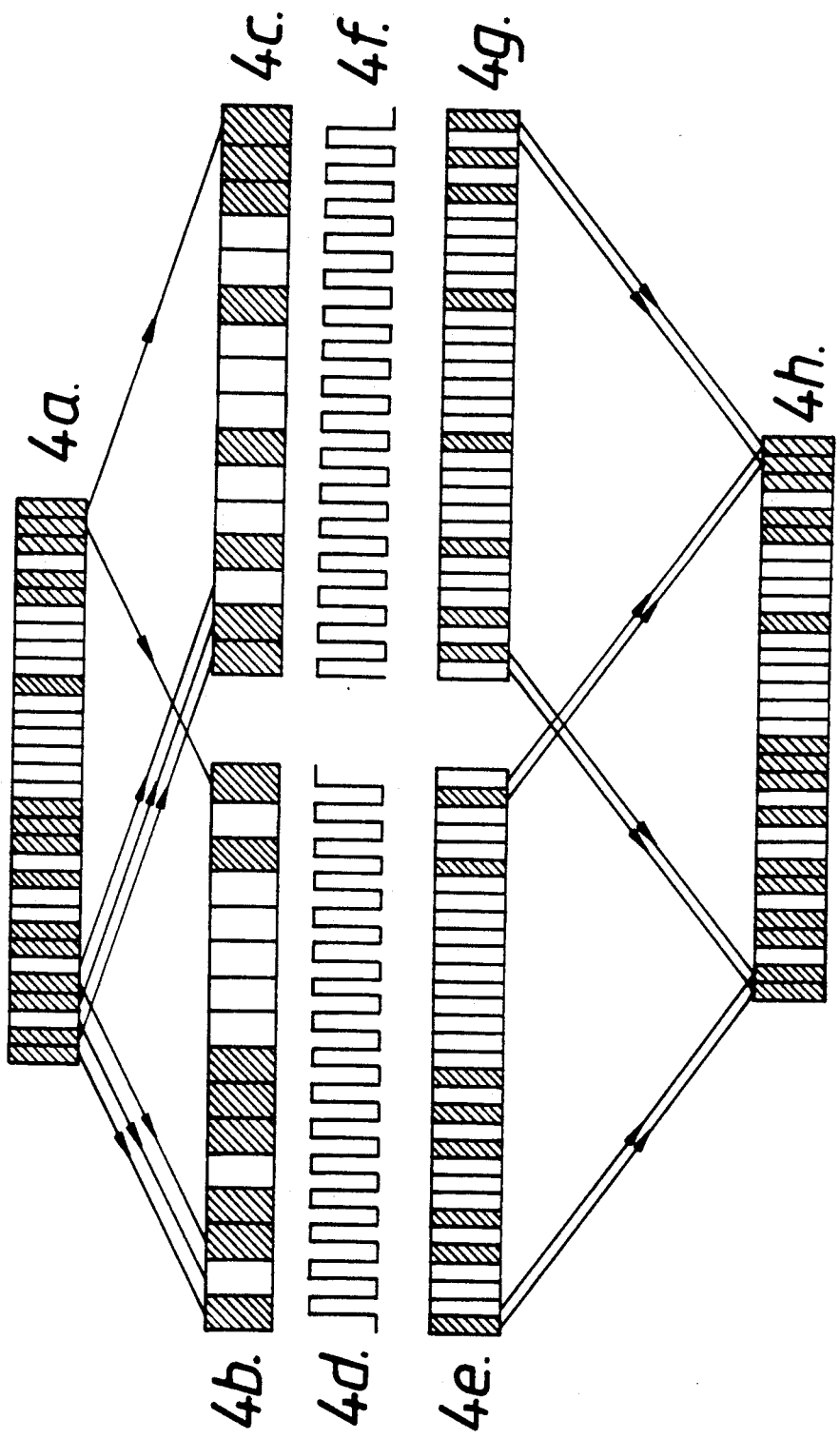
FIG. 4 illustrates signals used in providing the display.

The output of the two halves 51 and 52 of the memory 50 are supplied to a digital-to-analog converter 53 via a selector unit 54 which selects information from one or the other of the halves. During the first complete scan of the screen 2, the selector 54 connects the upper half 51 to the D/A converter 53 while, during the second scan, the lower half 52 is connected to the converter 53. This switching is continued so that, during odd scans, the upper half 51 is coupled to the converter 53 and, during even scans, the lower half 52 is coupled to the converter. The output from each half of the memory 50 comprises a series of 16 bit words which each correspond to a period of 32 pixels in azimuth. Each bit of the words corresponds to alternate pixels, with the words from one half corresponding to odd pixels and the words from the other half corresponding to even pixels. This can be seen in FIG. 4 where waveform 4a represents the total equivalent input signal to the memory 50 before dividing between the two halves and waveform 4b represents the corresponding output from the upper half 51 of the memory. The first bit in waveform 4b is filled because the first pixel is bright, whereas the second bit is unfilled because the third pixel is not bright. Waveform 4c represents the corresponding output from the lower half 52 of the memory 50 which has a filled first bit corresponding to a bright second pixel, and a filled second bit corresponding to a bright fourth pixel, and so on. Each bit of the output signals shown in waveforms 4b and 4c is twice the length of the bits in the input signal shown in waveform 4a.

The two sets of words from the output of the memory 50 are both subject to blanking which blanks out one half of each bit. As shown, this is conveniently performed by applying a 72 MHz square-wave blanking signals to the D/A converter 53 open line 55. More particularly, the word in waveform 4b corresponding to an odd scan is subject to the blanking signal shown in waveform 4d in which the latter half of each bit is blanked out. This produces an output on the screen as shown in waveform 4e. Even scan words, derived from the low half 52 of the memory, are subject to the blanking signal shown in waveform 4f in which the first half of each bit is blanked out. This gives an output on the screen 2 during even scans as shown in waveform 4g. The repetition rate of the scans and the decay time of the phosphor on the screen 2 are such that the odd and even scans produce a resultant screen display of the kind shown in the waveform 4h which corresponds to the signal shown in waveform 4a. It can be seen, therefore, that by using this technique it is possible to achieve a resolution at 36 KHz equivalent to what would otherwise require components capable of operating at 72 MHz.

At the edge of the screen 2, the linear speed of the CRT electron beam over the screen will be greater than close to the center C, because the time for one revolution is the same at all points. The brilliance of the electron beam is, therefore, increased at greater ranges so that the screen has a constant brightness in all regions.

Figure 5:
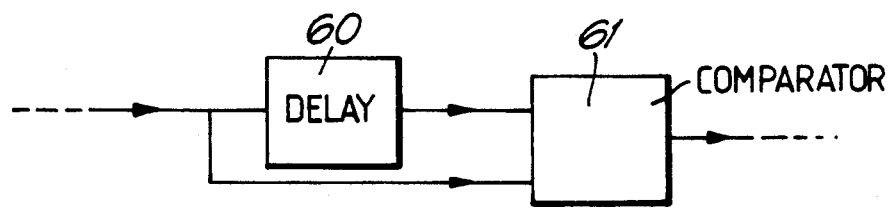
FIG. 5 is a schematic diagram of a part of the apparatus.

Interference can be suppressed in a simple but effective manner by the arrangement illustrated in FIG. 5 which comprises a delay 60 and a comparator 61. The arrangement is preferably included prior to the memory 50 so that video information in respect of all the pixels are supplied to the comparator 61 both directly and after a delay in 60 equivalent to one pixel. The comparator 61 is arranged to blank out any bright-up signal if the preceding pixel is not also bright. In this way, any radar return signal which is only one pixel wide in azimuth will be blanked out completely by the interference suppression circuit. A common cause of interference is the transmission of radar signals from other radar apparatus. Without any interference suppression these signals result in a narrow radial line on the screen that is only one pixel wide. The interference suppression circuit effectively removes all such interference. It will also have the effect of reducing clutter from rain and small waves. It can be seen that the effect of the interference suppression circuit will be to remove the leading pixel from all radar returns. This has been found to improve resolution in some circumstances, such as where two radar reflecting objects are located close together, since the spacing between the displayed returns is increased by one pixel.

Figure 6:
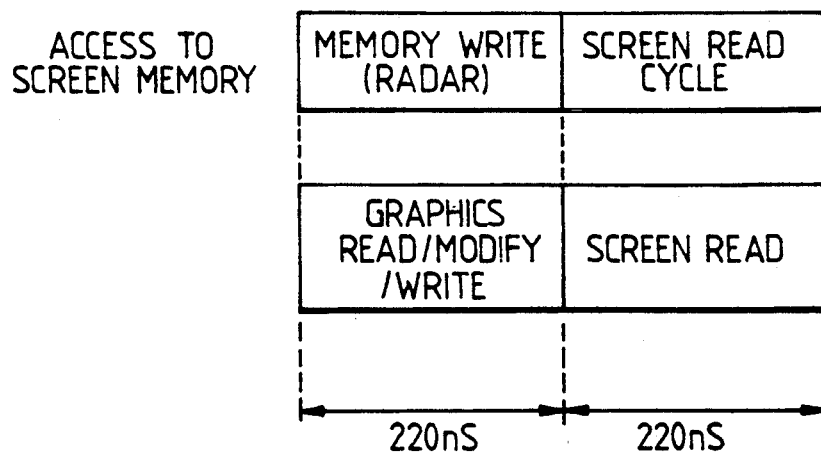
FIG. 6 shows the transfer of graphic data to the screen.

Instead of using a spiral scan pattern, the invention could be used with other angularly rotating scans such as, for example, involving separate concentric rings. The deflection circuit would, of course, have to be modified in order to produce a step function for the rings of different diameters. The resonant deflection coils described above would not be suitable in such a system.

Where desired, graphic data can be transferred to the screen, in the manner shown in FIG. 6, by using a transparent memory access via a graphics processors and graphics memory controller (neither shown). In this way, the "memory read to the screen" cycles are never interrupted.

Although the radar apparatus is of most use on ships, it could also have application in aircraft and in land-based installations such as coast-guard, harbour master, river and canal authorities applications where it can be advantageous to have a high resolution radar display at close range.

Having thus described our invention, we claim:

1. Radar apparatus including a display and a memory that stores information about the range and bearing of radar return signals, the apparatus including a deflection circuit that scans the display along curved lines in angular rotation, the apparatus including means for reading out from the memory information in respect of alternate pixels, and means for interleaving alternate bearing pixels of one scan of the display with alternate bearing pixels of the next scan.

2. Radar apparatus according to claim 1 wherein said deflection circuit includes means for scanning the display in a spiral scan.

3. Radar apparatus according to claim 2, wherein said deflection circuit includes two deflection coils, a capacitor connected to each respective coil, and a circuit that supplies two sinusoidal signals in phase quadrature to respective ones of the coils, said coils being resonant.

4. Radar apparatus according to any one of claims 1, 2 or 3 wherein said means for reading information from the memory includes means for reading out information in the form of plural-bit words with each bit equivalent to two pixels in bearing.

5. Radar apparatus according to claim 4, wherein the apparatus includes a blanking circuit that blanks out one half of each bit read out from the memory.

6. Radar apparatus according to claim 5, wherein the blanking circuit includes a digital-to-analog converter.

7. Radar apparatus according to claim 1 wherein said memory is divided into two halves the apparatus being operative to supply radar return signals in respect of alternate pixels to different ones of the two halves of the memory, and the apparatus being operative to read out the contents of one half of the memory during one scan and to read out the contents of the other half of the memory during the next scan.

8. Radar apparatus according to claim 1 wherein said memory has locations arranged by range and bearing.

9. Radar apparatus according to claim 1 wherein the apparatus includes a circuit that rejects radar signals indicative of a radar target in a pixel unless the radar signals also indicate the presence of a target in an adjacent pixel.

10. Radar apparatus, according to claim 9, wherein said circuit that rejects radar signals includes a comparator and a delay that introduces a delay equivalent to one pixel into the radar signals, the comparator receiving radar signals directly and via the delay and rejecting those direct signals which are not the same as the delayed signals.

11. Radar apparatus according to claim 9 or 10, wherein said circuit that rejects radar signals is located at the input of the memory so that only signals not rejected by the circuit are passed to the memory.

12. Radar apparatus according to claim 1 wherein the apparatus increases the brilliance of the display at increasing radial distance from the center of the scan in such a way as to produce a substantially even brightness for radar targets over the display.

* * * * *